United States Patent [19]

Heyer et al.

[11] Patent Number: 5,653,226
[45] Date of Patent: Aug. 5, 1997

[54] DEVICE FOR GENERATING OXYGEN

[75] Inventors: Harald Heyer, Lübeck; Herbert Röhl, Reinfeld, both of Germany

[73] Assignee: Drägerwerk AG, Lübeck, Germany

[21] Appl. No.: 496,425

[22] Filed: Jun. 29, 1995

[30] Foreign Application Priority Data

Oct. 22, 1994 [DE] Germany .................. 44 37 895.5

[51] Int. Cl.⁶ .................................................. A62B 7/08
[52] U.S. Cl. ..................... 128/202.26; 128/202.25; 128/205.24; 128/205.12; 128/205.28; 422/120
[58] Field of Search .................. 128/202.26, 205.13, 128/205.24, 205.28, 202.25, 205.12, 204.22; 422/122, 120

[56] References Cited

U.S. PATENT DOCUMENTS

| | | | |
|---|---|---|---|
| 2,889,210 | 6/1959 | Bovard | 128/202.26 |
| 3,898,047 | 8/1975 | Cramer | 128/202.26 |
| 4,209,491 | 6/1980 | Rich, III | 128/202.25 |
| 4,717,549 | 1/1988 | Malafosse et al. | 128/205.08 |
| 4,822,572 | 4/1989 | Sorissen et al. | 128/202.26 |

FOREIGN PATENT DOCUMENTS 679503  8/1939  Germany.

Primary Examiner—Vincent Millin
Assistant Examiner—V. Srivastava
Attorney, Agent, or Firm—McGlew and Tuttle

[57] ABSTRACT

A device for generating oxygen by the thermal decomposition of a chemical contained in a cartridge housing, whose reaction takes place, beginning from an activation point, along a reaction front propagating in the interior of the cartridge housing in the direction of an unspent chemical, with a feed line with a restrictor, which feed line originates from the cartridge housing from the area of the unspent chemical in front of the reaction front, for drawing off the oxygen generated, shall be improved in terms of a more uniform release of the oxygen generated. To accomplish this task, a compensating line, which opens into the interior of the cartridge housing in the area of the spent chemical behind the reaction front, is connected to the cartridge housing.

15 Claims, 3 Drawing Sheets

5,653,226

DEVICE FOR GENERATING OXYGEN

FIELD OF THE INVENTION

The present invention pertains to a device for generating oxygen by the thermal decomposition of a chemical located in a cartridge housing, whose reaction into a spent chemical takes place, beginning from an activation point, along a reaction front propagating in the interior of the cartridge housing in the direction of an unspent chemical, with a feed line with a restrictor, which line originates from the cartridge housing from the area of the unspent chemical in front of the reaction front.

BACKGROUND OF THE INVENTION

A breathing apparatus, in which the oxygen needed for breathing is generated by the thermal decomposition of a chemical, has become known from German Patent No. DE-PS 679 503. The oxygen-generating chemical is accommodated in the interior of a cylindrical cartridge housing and is activated by means of an igniting composition located at one of the ends of the cartridge. A feed line with a restrictor, via which line the oxygen generated is fed into a breathing bag, from which the user of the breathing apparatus receives his breathing gas, is connected to the opposite end of the cartridge. The reaction temperature of approx. 300° C. to 800° C. necessary for the chemical reaction is generated by the igniting composition in the chemical in contact with the igniting composition. A reaction front develops in the area of the igniting composition and gradually propagates in the interior of the cartridge housing in the direction of the yet unreacted chemical, develops in the area of the igniting composition. Dusts and gases, which act on the yet unreacted chemical particles as a reaction-accelerating catalyst, are formed during the reaction within the reaction front. The amount of oxygen generated per unit of time also increases in a chemical reaction that takes place in an accelerated manner.

The disadvantage of the prior-art breathing apparatus is that the flow of oxygen supplied from the cartridge is generally subject to great variations, because the thermal decomposition depends on the design of the cartridge and the ambient temperature, and it takes place, in general, nonuniformly. Even though the course of the chemical reaction over time can be improved by a special cartridge design, e.g., with reaction control elements or with heat-conducting plates within the chemical, these measures markedly increase the manufacturing costs, especially because the cartridge is a disposable item.

SUMMARY AND OBJECTS OF THE INVENTION

The primary object of the present invention is to improve a device of the type described in terms of the more uniform generation of oxygen.

This object is attained by at least one compensating line, which opens into the interior of the cartridge housing behind the reaction front in the area of the spent chemical, being connected to the cartridge housing.

The advantage of the present invention is based on the fact, found surprisingly, that the reaction of the chemical, i.e., the intensity of the oxygen production, can be controlled by deflecting part of the flow of oxygen or even the entire flow of oxygen from the area of the unspent chemical into the area of the spent chemical behind the reaction front and by drawing off the oxygen from the interior of the cartridge behind the reaction front via the compensating line. This control is achieved because the chemical reaction is decelerated by deflecting the oxygen into the area behind the reaction front, since the dispersion of the dusts and gases formed during the reaction, which act as a catalyst, to the unspent chemical is hindered. The chemical may be introduced into the cartridge housing in the form of a homogeneous, porous molding, or it may comprise individual-shaped bodies, which are contained in the cartridge housing as a bulk material. The intensity of the chemical reaction of the chemical, i.e., the rate of flow of the oxygen generated, depends on the degree of deflection of the flow of oxygen, and the degree of deflection of the flow of oxygen is determined by a restrictor located at least in the flow path of the feed line. If a low flow rate of oxygen is needed, a restrictor with small cross section is used, with which a large portion of the flow of oxygen can be deflected. In the opposite case, i.e., in the case of a high oxygen demand, only a small portion of the oxygen is deflected. It was also surprisingly found that the dependence of the thermal decomposition on the ambient temperature is reduced by the deflection of the flow of oxygen, and a uniform flow of oxygen becomes established in a broad ambient temperature range.

The compensating line is advantageously connected to the cartridge housing in the area of the activation point. In the case of a cylindrical cartridge housing with two cartridge covers placed on the ends, it is advantageous to provide the cartridge covers with connecting branches for the feed line and the compensating line. The activation point is also additionally arranged on the cartridge cover accommodating the compensating line.

A first metering valve is advantageously provided as a restrictor in the feed line. By changing the opening cross section of the first metering valve, more or less oxygen can be deflected in the direction of the compensating line, and the intensity of oxygen production can thus be influenced.

A restrictor in the form of a second metering valve is advantageously also arranged on the compensating line. By changing the flow resistance in both the feed line and the compensating line, improved control of oxygen production is possible.

Especially good utilization of the oxygen generated is possible if the feed line and the compensating line are united at a T-shaped branching point, and the oxygen generated is fed to the user via a common line.

The restrictor is advantageously designed as a feed pump connecting the feed line to the compensating line. The feed pump may be optionally operated in countercurrent, i.e., deflecting part of the oxygen from the area of the unspent chemical into the spent chemical in the case of excessive oxygen production, or in co-current, feeding the oxygen from the spent chemical into the unspent chemical when the mount of oxygen generated is too small.

The first and second metering valves are advantageously parts of a double-diaphragm valve, in which the degree of opening of the metering valves is controlled by the pressure in the cartridge housing. The second metering valve is essentially closed and the first metering valve is opened in the case of low pressure in the cartridge housing, so that the oxygen can flow off via the feed line. As the pressure increases, the first metering valve is increasingly closed, and the flow of oxygen is deflected in the direction of the compensating line, as a result of which the oxygen production is reduced.

A measuring device, which monitors the course of the reaction in the cartridge housing, is advantageously arranged downstream of the branching point or downstream of one of the metering valves. The measuring device may be, e.g., a flow- or pressure-measuring device.

The measuring device is advantageously connected to a control device, which is in functional connection with the first metering valve and/or with the second metering valve or the feed pump. A preselected flow of oxygen downstream of the branching point or one of the metering valves can be set with the control device.

In an advantageous embodiment of the present invention, the preselected desired value for the flow of oxygen is set on the basis of a pulse rate or electrocardiographic measured value, which is supplied by a user connected to the gas outlet of the device. It is thus possible to adjust the oxygen production to the oxygen demand.

A further object of the invention is to provide a device for generating oxygen which has an advantageous design as noted above which is rugged in construction and which is economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
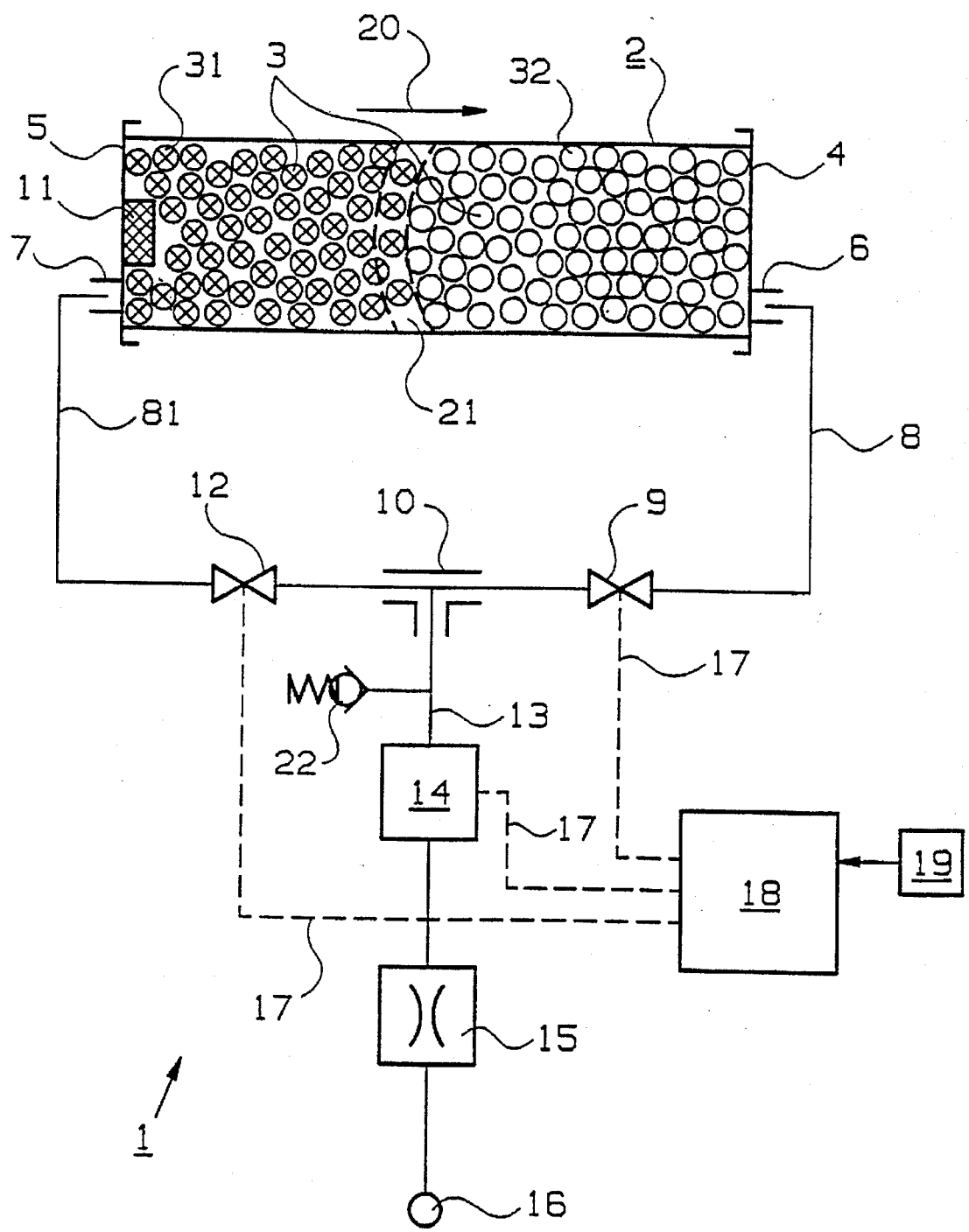
FIG. 1 is a schematic representation of a device for generating oxygen.

FIG. 1 shows a first device 1 for generating oxygen by the thermal decomposition of a chemical contained in a cartridge housing 2. The chemical is a bulk material comprised of shaped bodies. The chemical may be a mixture of sodium chlorate and silicon or magnesium as catalyst (see, for example, U.S. Pat. No. 5,038,767, which is hereby incorporated by reference). The cartridge housing 2 is dosed with two cartridge covers 4, 5, which are provided with connecting branches 6, 7 opening into the interior of the cartridge housing 2. A feed line 8, which is connected to a T-piece 10 acting as a branching point via a first metering valve 9 acting as a restrictor, is connected to the connecting branch 6 on the right-hand cartridge cover 4. The left-hand cartridge cover 5 has an igniting device (starting device) 11, with which the chemical reaction of the chemical 3 is initiated. A compensating line 81, which is also connected to the T-piece 10 via a second metering valve 12, is connected to the connecting branch 7 on the left-hand cartridge cover 5.

The line 13 originating from the T-piece 10 leads to a gas outlet 16 via a flow-metering device 14 and a flow resistance 15. The metering valves 9, 12 and the flow-measuring device 14 are connected via signal lines 17 to a control device 18, which receives a desired flow value via a setting means. The chemical reaction of the chemical 3 takes place in the direction of the arrow 20, beginning from the igniting device 11, along a reaction front 21, which is the boundary line between the spent chemical 31 and the unspent chemical 32, as partial amounts of the chemical 3. The spent chemical 31 is marked by crosses in the figure. The flow resistance 15 is designed to be such that it affects the chemical reaction only relatively slightly, and is used only to smooth the flow of oxygen. A pressure relief valve 22, which opens in the case of an unacceptably high pressure buildup, e.g., with the gas outlet 16 dosed, is located between the T-piece 10 and the flow-measuring device 14.

The mode of operation of the first device 1 according to the present invention is based on the discovery that the rate of the chemical decomposition of the chemical 3 can be influenced by deflecting part of the oxygen generated from the area of the unspent chemical 32 into the area of the spent chemical 31. If, e.g., the flow of oxygen measured with the flow-measuring device 14 is above a preselected limit value, the first metering valve 9 is actuated by the control device 18 in the direction of the closed position, while the second metering valve 12 is opened more widely. The chemical reaction of the chemical 3 slows down, and the flow of oxygen decreases due to a reduction of the flow of oxygen in the direction of arrow 20. In the opposite case, when the flow of oxygen drops below a lower limit value, the control unit 18 opens the first metering valve 9, and it actuates the second metering valve 12 in the direction of the closed position. The flow of oxygen increases because of the increasing rate of the chemical decomposition reaction of the chemical 3. The upper and lower limit values for the flow of oxygen are set by the control device 18 on the basis of the desired flow value sent by the setting means 19.

Figure 2:
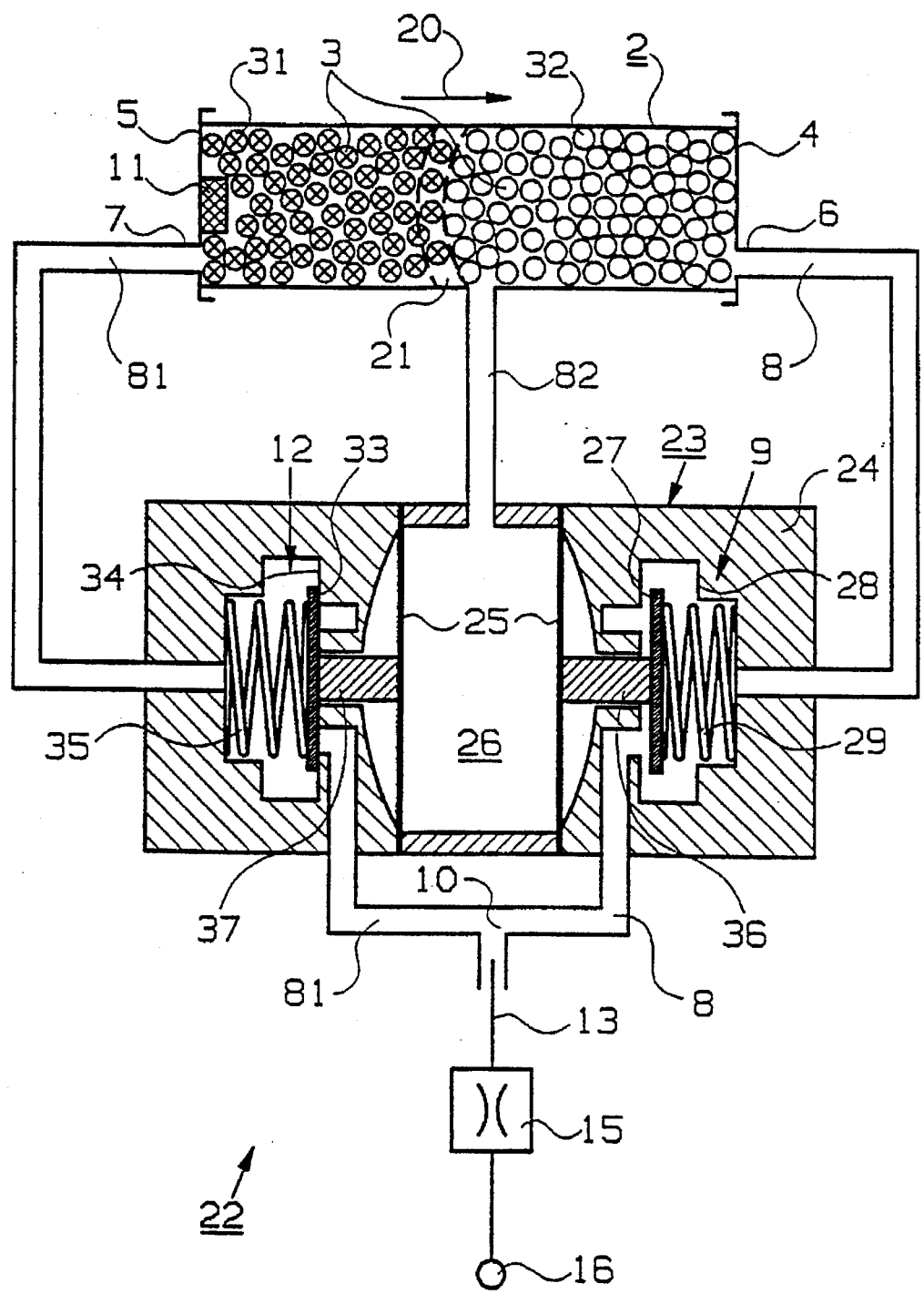
FIG. 2 is a schematic sectional view of a device for generating oxygen with a double-diaphragm valve.

FIG. 2 shows a second device 22 for generating oxygen, in which the metering valves 9, 12 are parts of a double-diaphragm valve 23. Inside a housing 24, the double-diaphragm valve 23 has two elastic diaphragms 25, which define a pressure space 26. The pressure space 26 is connected to the interior of the cartridge housing 2 via a control line 82. The first metering valve 9 consists of a first valve plate 27, a first valve seat 28 and a first valve spring 29. The second metering valve 12 has a second valve plate 33, a second valve seat 34 and a second valve spring 35. The diaphragms 25 are connected to the first valve plate 27 via a first push rod 36 and to the second valve plate 33 via a second push rod 37. Identical components are designated by the same reference numbers as in FIG. 1.

The mode of operation of the second device is as follows:

The diaphragms 25 bulge out more or less markedly under the effect of the pressure occurring in the cartridge housing 2, and the first valve plate 27 is displaced by means of the first push rod 36 in the direction of the first valve seat 28, as a result of which the flow of oxygen in the feed line 8 is restricted, and the second valve plate 33 is lifted off from the second valve seat 34, as a result of which a flow of oxygen into the line 13 via the compensating line 81 is possible. The higher the pressure in the cartridge housing 2, the more is the first metering valve 9 closed, the flow of oxygen in the feed line 8 is restricted and deflected in the direction of the compensating line 81. As the first metering valve 9 closes, the second metering valve 12 opens. On the other hand, the second metering valve 12 is almost closed in the case of a low pressure in the cartridge housing 2, and the oxygen can flow off into the line 13 via the nearly opened first metering valve 9.

Figure 3:
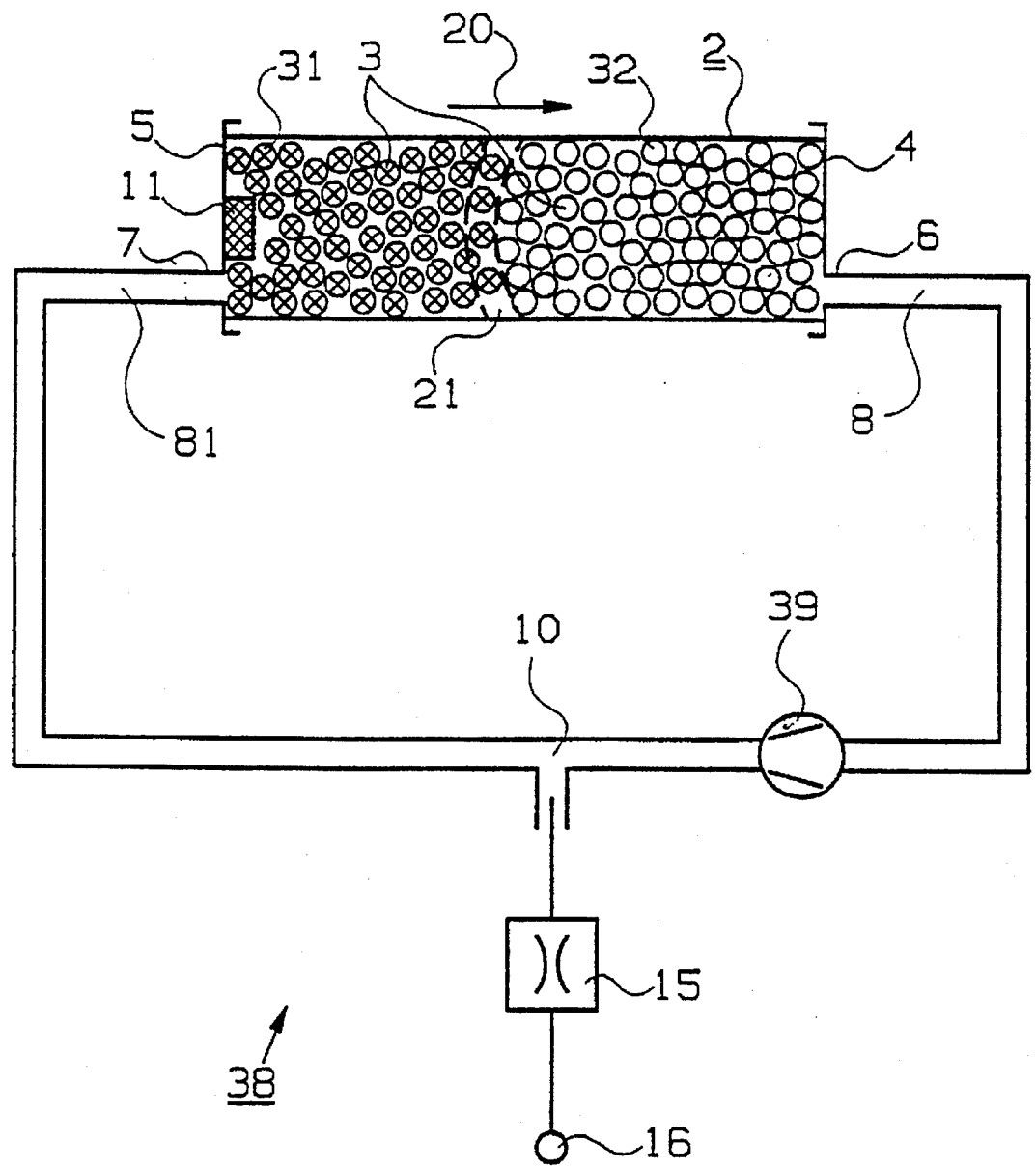
FIG. 3 is a schematic sectional view of a device for generating oxygen with a feed pump.

FIG. 3 shows a third device 38, in which a feed pump 39 is used to deflect the flow of oxygen from the unspent chemical 32 to the spent chemical 31 via the reaction front 21. Identical components are designated by the same reference numbers as in FIG. 1. The feed pump 39 is designed such that the direction of delivery is reversible. Thus, the oxygen production can also be increased when the feed pump 39 pumps oxygen from the feed line 8 into the compensating line 81. In the opposite case, i.e., in the opposite direction of delivery, the oxygen production is more or less markedly reduced.

While a specific embodiment of the invention has been shown and described in detail to illustrate the application of the principles of the invention, it will be understood that the invention may be embodied otherwise without departing from such principles.

What is claimed is:

1. A device for generating oxygen by thermal decomposition of a chemical, the device comprising:
    a cartridge housing, the chemical being disposed in the cartridge housing, thermal decomposition beginning from an activation point and proceeding along a reaction front, the reaction front propagating in the interior of said cartridge housing to define a spent chemical side and an unspent chemical side, said reaction front moving in the direction of the unspent chemical side;
    a feed line extending from said cartridge housing, from an area of said unspent chemical, in front of a path of said reaction front;
    restrictor means for regulating flow through said feed line connected to said feed line; and
    a compensating line for decelerating the thermal decomposition by deflecting the oxygen into said cartridge housing in an area of said spent chemical, behind said reaction front.

2. A device according to claim 1, wherein said compensating line is connected to said cartridge housing adjacent to said activation point.

3. A device according to claim 1, wherein said restrictor means includes a first metering valve provided in said feed line.

4. A device according to claim 2, wherein said restrictor means includes a first metering valve provided in said feed line.

5. A device according to claim 1, further comprising compensating line restrictor means, provided in said compensating line, for regulating flow through said compensating line.

6. A device according to claim 5, wherein said compensating line restrictor means includes a metering valve.

7. A device according to claim 1, wherein said compensating line and said feed line are united at a branching point; a common line being connected to said branching point.

8. A device according to claim 1, wherein said restrictor means includes a feed pump.

9. A device according to claim 5, wherein said compensating line restrictor means and said restrictor means define first and second metering valves which are part of a double-diaphragm valve, said double-diaphragm valve including pressure-responsive means, responsive to pressure in said cartridge housing.

10. A device according to claim 4, further comprising measuring means for measuring a course of the reaction in said cartridge housing, said measuring means being provided downstream of said first metering valve.

11. A device according to claim 5, further comprising measuring means for measuring a course of the reaction in said cartridge housing, said measuring means being provided downstream of said first restrictor means and said second restrictor means.

12. A device according to claim 11, wherein said measuring means is arranged downstream of said branching point.

13. A device according to claim 7, further comprising measuring means for monitoring the course of the reaction in said cartridge housing, said measuring means being arranged downstream of said branching point.

14. A device according to claim 11, wherein said measuring means includes a control device, said measuring means being a functional connection with at least one of said compensating line restrictor means and said restrictor means, said measuring means for setting a preselected value for a flow of oxygen.

15. A device according to claim 14, wherein said measuring means is connected to a medical sensing device, comprising one of a pulse rate detector or electrocardiographic measuring means, said measuring means setting said oxygen flow value based on signals received from said medical sensing device.

* * * * *